(12) United States Patent
Murray et al.

(10) Patent No.: US 6,517,428 B1
(45) Date of Patent: *Feb. 11, 2003

(54) WORK STATION HAVING AN AIR FLOW CONTROLLER

(75) Inventors: Dale Murray, Elkton, MD (US); Thomas Darby, Dallas, TX (US); Eric Dietrich, Woodbine, MD (US); Adam Cohen, Worcester, MA (US); Josh Tang, Pepperell, MA (US)

(73) Assignee: Lab Products, Inc., Seaford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/705,682

(22) Filed: Nov. 3, 2000

Related U.S. Application Data (63) Continuation-in-part of application No. 09/435,185, filed on Nov. 5, 1999, now Pat. No. 6,217,437.

(51) Int. Cl.[7] ................................................. A01K 1/00
(52) U.S. Cl. ..................... 454/56; 119/419; 119/452; 119/473; 119/500; 454/187
(58) Field of Search .......................... 454/49, 57, 187, 454/230, 229, 232, 233; 119/418, 419, 452, 472, 473, 500; 55/385.2, 467, 473

(56) References Cited

U.S. PATENT DOCUMENTS

| | | | | |
|---|---|---|---|---|
| 3,557,756 A | * | 1/1971 | Ramsey | 119/419 |
| 3,630,174 A | * | 12/1971 | Runkle et al. | 119/419 |
| 3,924,571 A | * | 12/1975 | Holman | 119/419 |
| 3,944,405 A | * | 3/1976 | Van Calsteren et al. | 454/56 |
| 4,623,367 A | * | 11/1986 | Paulson | 108/50.12 |
| 5,944,602 A | * | 8/1999 | Grundy | 16/266 |

FOREIGN PATENT DOCUMENTS

| | | | | |
|---|---|---|---|---|
| GB | 1179551 | * | 1/1970 | 119/419 |

* cited by examiner

*Primary Examiner*—Harold Joyce
(74) *Attorney, Agent, or Firm*—Stroock & Stroock & Lavan LLP (57) ABSTRACT

A work station having an environmental controller for maintaining air flow in and through the work station at a user-selected level. The work station includes a pressure cabinet and a perforated work surface forming the top of the pressure cabinet. A pressure inducing assembly is located within the cabinet below the work surface to draw air into the cabinet and create a negative pressure in a work space defined above the work surface. A support coupled to two sides of the pressure cabinet provides a channel for air flow from the pressure cabinet to an air chamber located above the work surface. Air is drawn from the air chamber generally downward toward the work surface by the negative pressure created in the work space to provide an air curtain substantially surrounding the work surface.

12 Claims, 14 Drawing Sheets

WORK STATION HAVING AN AIR FLOW CONTROLLER

CROSS-REFERENCE TO RELATED APPLICATION

This is a Continuation-In-Part of U.S. patent application Ser. No. 09/435,185, filed on Nov. 5, 1999 U.S. Pat No. 6,217,437.

BACKGROUND OF THE INVENTION

This invention is directed to a work station at which laboratory animals can be moved from one cage to another and which includes an air flow controller.

Laminar flow work stations are known in the art, such as, for example, Lab Products Inc. model numbers Stay-Clean 30909B and 30910B. Those work stations include a table surface enclosed on three-sides by a hood that extends generally upward from the table surface. That configuration creates a housing about the work surface with one open side thereby limiting access and viewability to the work surface. At least a portion of the work surface is perforated to allow air to flow therethrough. Flow blowers are disposed beneath the surface to cause a negative pressure at the table surface perforations to draw air from the work surface, and front exterior area, in through the work surface to filter the air. In this way, any impurities at the work station which are airborne and likely to contaminate worker and animals at the work station are prevented from reaching the worker or animals. However, air flow in and through the work station is manually set by a user, technician, etc., to provide a relatively fixed air flow in and through the work station.

While such a work station has been satisfactory, the lack of automatic control of the work station environment limits the use of the work station to situations having somewhat more relaxed air control requirements. For example, a work station having such a manually controllable environment may not be usable where a relatively high degree of air control is required.

SUMMARY OF THE INVENTION

The present invention is directed to a work station having an environmental controller for maintaining air flow in and through the work station at a user-selected level. The work station includes a pressure cabinet and a perforated work surface forming the top of the pressure cabinet. A pressure inducing assembly is located within the cabinet below the work surface to draw air into the cabinet and create a negative pressure in a work space defined above the work surface. A support coupled to two sides of the pressure cabinet provides a channel for air flow from the pressure cabinet to an air chamber located above the work surface. Air is drawn from the air chamber generally downward toward the work surface by the negative pressure created in the work space to provide an air curtain substantially surrounding the work surface.

The work station of the present invention may be a single- or double-sided work station. In a single-sided embodiment, user access to the work surface is from one side of the station, and simultaneously from both sides in a double-sided embodiment.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIGS. 6A–6L are detailed schematics of a controller in accordance with the present invention.

DETAILED DESCRIPTION OF THE PREFERRED EMBODIMENTS

The present invention is directed to a single- or double-sided work station having a controller for monitoring and controlling air flow in and through the work station. In a single-sided work station, the controller of the present invention controls airflow in and through the work station by continuously monitoring the rotational speed of the fan and by controlling that speed to ensure a desired air flow rate (e.g., in cubic feet per minute) in and through the work station. In a double-sided work station, the controller of the present invention receives air flow input data from a thermistor or pitot tube, and controls the rotational speed of one or more blowers by automatically and continuously adjusting the blower rotational speed to maintain a desired rate of air flow in and through the work station.

Figure 1:
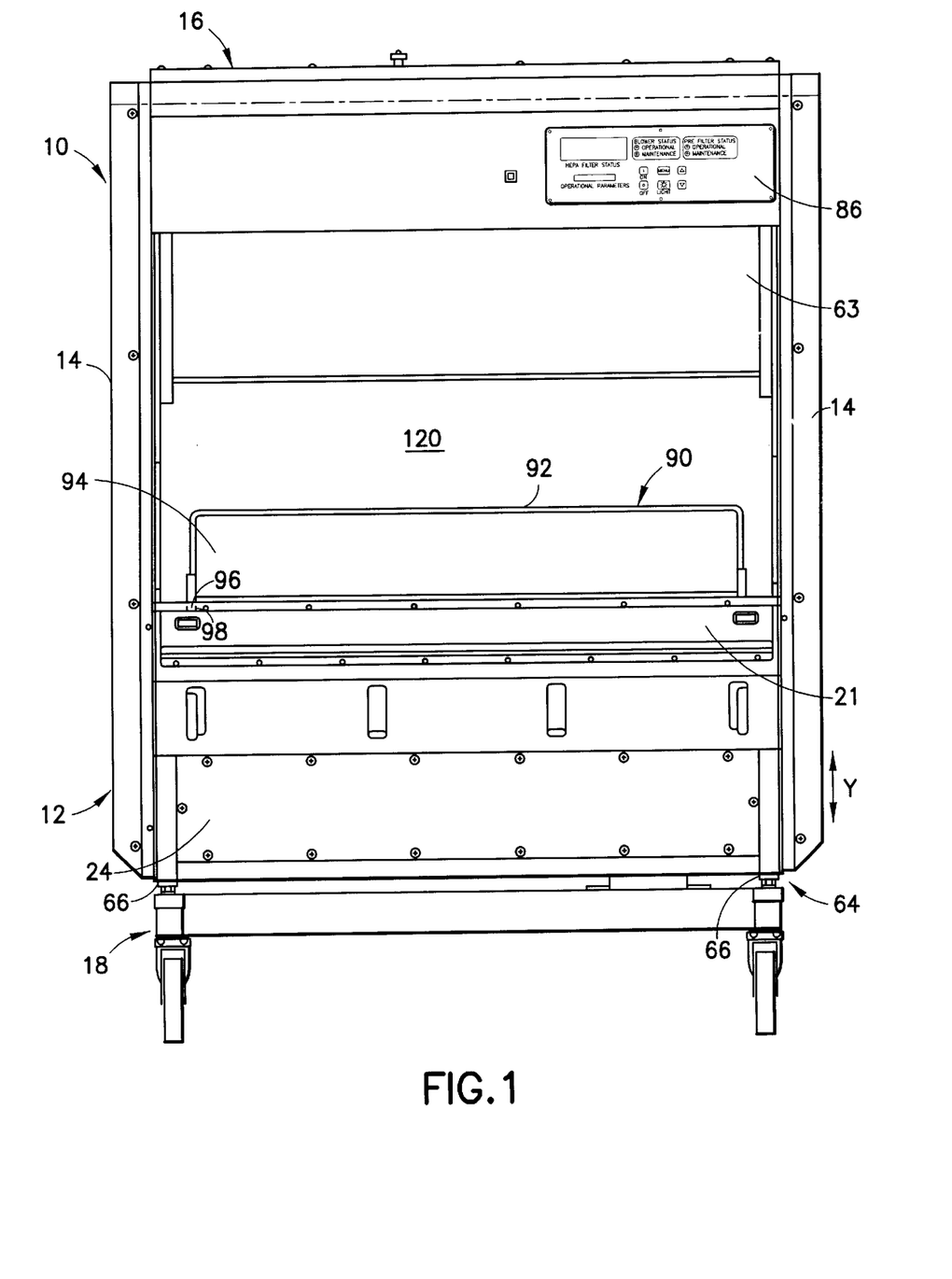
FIG. 1 is a front view of a double-sided work station constructed in accordance with an embodiment of the present invention.
Figure 2:
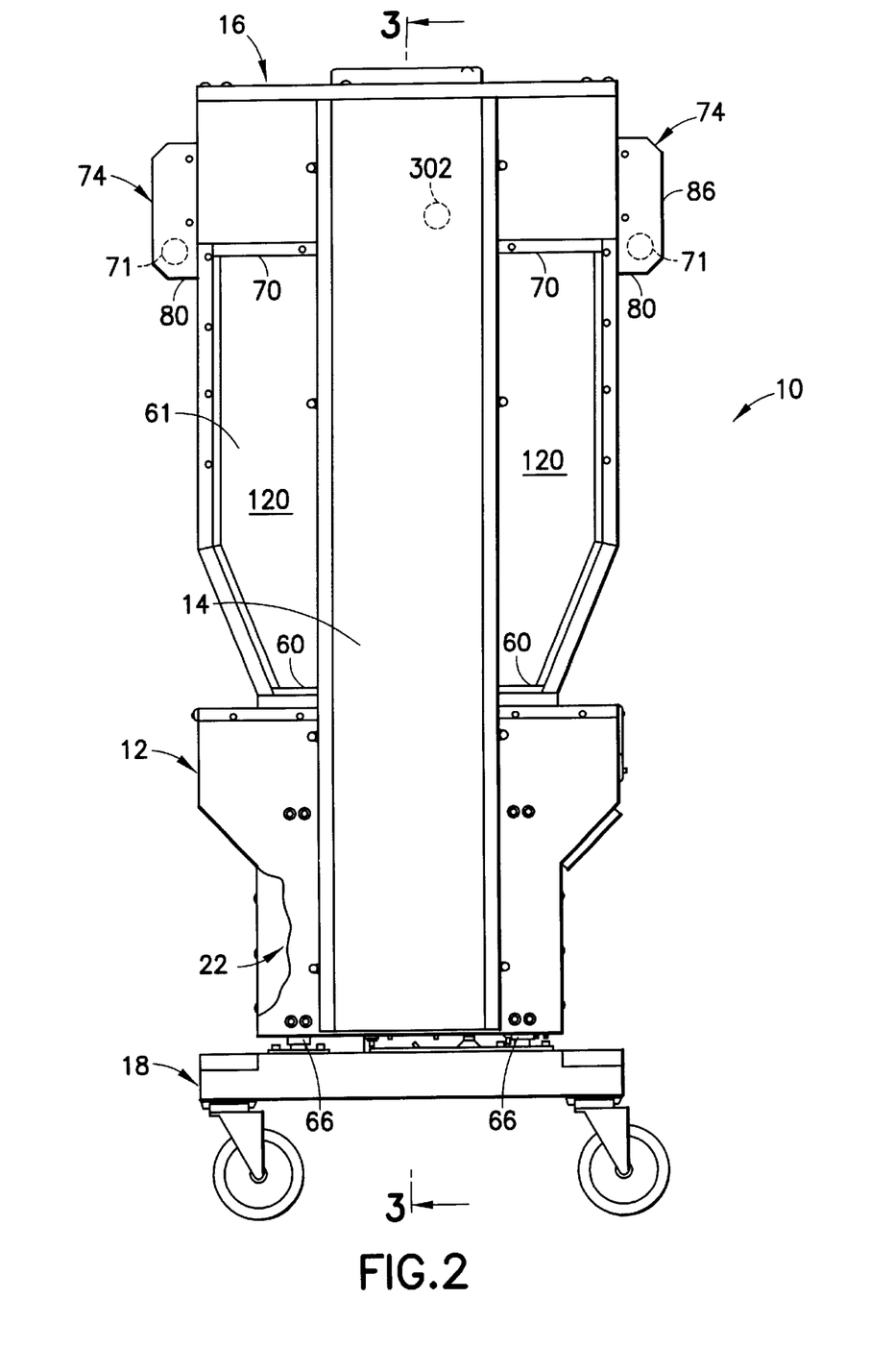
FIG. 2 is a side view of the work station depicted in FIG. 1.
Figure 3:
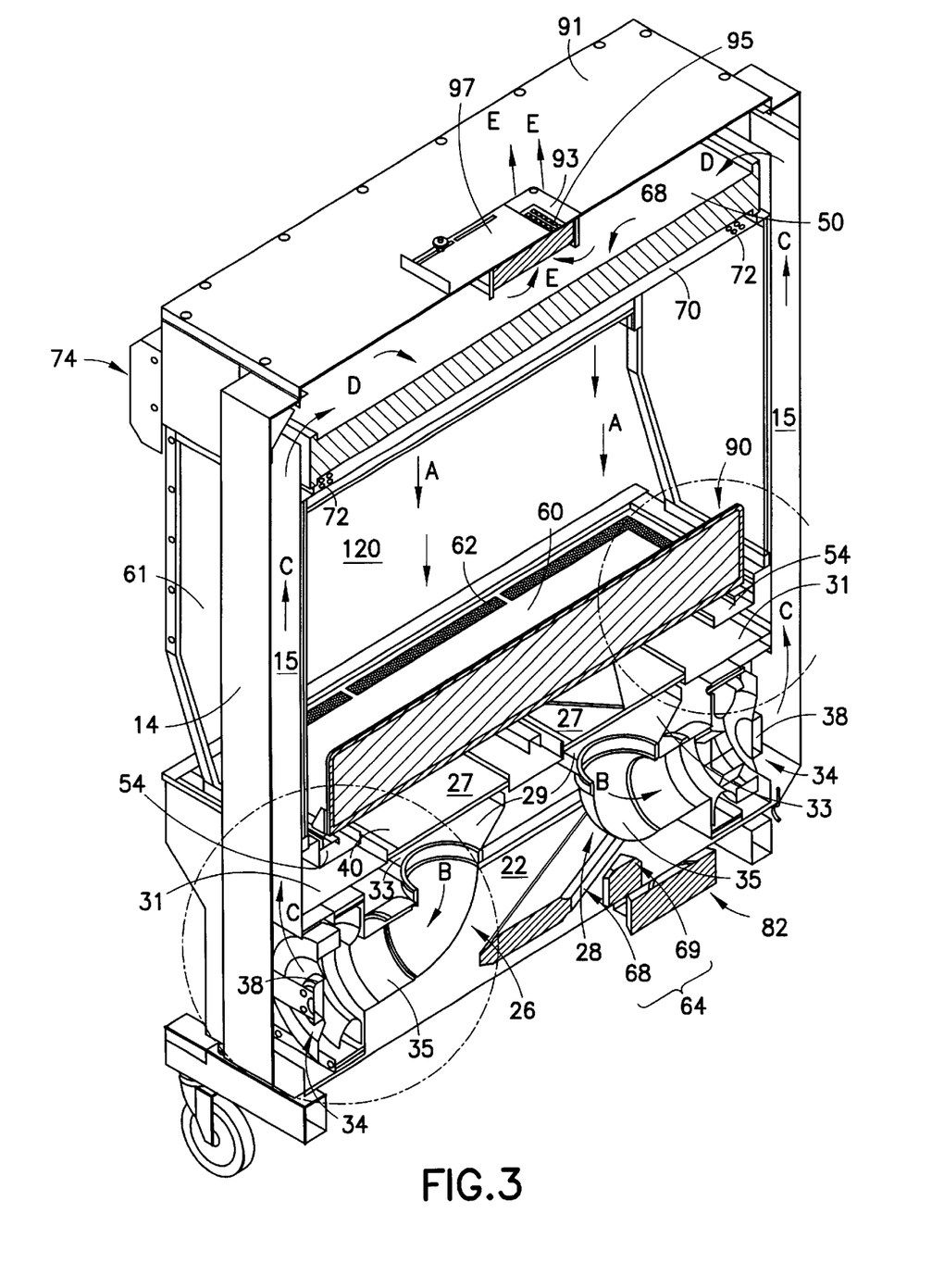
FIG. 3 is a cross-sectional view of the work station of FIG. 2 taken along line 3—3.

Referring now to the drawings in detail, a double-sided work station, generally indicated as 10, and constructed in accordance with an embodiment of the present invention is depicted in FIGS. 1–3. Referring first to FIG. 1, the inventive work station 10 includes a base 12 and a top cabinet 16 supported above the base 12 by two generally vertical supports 14 extending generally upward from the base 12. An air channel 15 is defined though each support 14 and provides a path for air flow from the base 12 to the top cabinet 16, as discussed in more detail below. A work space 120 is defined between the base 12 and top cabinet 16, and is generally delineated by a work surface 60 of the base 12, and a ceiling 70 of the top cabinet 16. The work space 120 is the area in which a user (i.e., technician) will utilize the work station 10 to carry-out a task related to a laboratory animal (i.e., change/clean the animal's cage). Connected to the base 12 is a wheel assembly 18 that facilitates easy movement of the work station 10.

The work surface 60 of the base 12 has a plurality of perforations 62 provided at least partially about its perimeter and preferably provided completely about the surface perimeter. As can be seen clearly in FIGS. 1 and 3, because top cabinet 16 is supported at the sides by supports 14, the work station 10 provides an open, double-sided work station to which access can be provided from both the front and back. Therefore, at least two workers can work at the work station 10 on separate cages, for example, and both on the same side of the work station 10 or opposite each other. In order to prevent cross-contamination of the animals within the cages between workers, a divider 90 is provided that separates the surface 60 into two distinct and separate work areas. Divider 90 is substantially a screen having a frame 92 and a body portion 94 supported therein. Frame 92 includes pegs 96 which are received by holes 98 in surface 60 to allow easy removal of divider 90.

A transparent shield 61 may be provided to at least partially enclose the sides of the work space 120, and a laminate shroud 63 may also be provided about top cabinet 16 to better confine and guide air passing from the top cabinet 16 to the base 12, as described in more detail below. While the shield 61 may extend from the top cabinet 16 to the base cabinet 12, the shroud 63 preferably does not to provide access to the surface 60 and work space 120. A removable access plate 24 provides access to a pressure cabinet 22 provided in the base 12 for repair and maintenance. A pivotable access panel 21 may also be provided in the base 12 to facilitate access to prefilters 40 and a pan 54, each discussed in more detail below.

As can be seen in FIG. 3, a pan 54 is provided beneath the surface 60 to collect any dirt which may pass through perforated opening 62 which are not air-borne and to protect blower 34 from spillage of cleaning agents. Work surface 60 is supported by flange 56 so as to form a top surface of base 12.

With continued reference to FIGS. 1–3, top cabinet 16 is supported directly above surface 60 by supports 14, and is at least coextensive with surface 60 so as to define a work space 120 between the top cabinet 16 and surface 60. Top cabinet 16 has an air chamber 68 defined therein which communicates with the air channel 15 defined through supports 14 and has a lower surface with a plurality of perforations 72 defined therethrough that defines an air diffuser ceiling 70 for the work station 10. The perforations 72 permit air to pass from the chamber 68 in a generally uniform pattern and toward surface 60. This results in the recirculation of air between an input at surface 60 (via perforations 62) and an output at ceiling 70 (via perforations 72). By placing perforations 72 at least at the periphery of ceiling 70 so as to correspond with perforations in 62 at the work surface 60, a curtain of filtered air is provided that separates the work space of work station 10 from the ambient environment and also captures some ambient air.

A HEPA filter 50 is provided in chamber 68 adjacent ceiling 70 to filter air as it passes from the chamber 68 through the perforations 72 and is drawn generally downward into the work space 120 and toward surface 60. Placement of HEPA filter 50 in the top cabinet 16 and directly at location at which air is drawn into the work space 120 ensures that virtually all particulate matter (and possibly other matter, depending upon the characteristics of the HEPA filter), are removed from the air flow and do not enter the work space 120. The integrity of the atmosphere in the work space 120 is thus controlled and maintained. A screen (not shown) may be provided at an outlet side of HEPA filter 50 (i.e., that side facing the work space 120) to protect the filter 50 from exposure to and potential damage from activities carried out on the surface 60 and in the work space 120.

A control and light enclosure 74 provided on two sides of the top cabinet 16 includes a light source 71, preferably a fluorescent lamp, and a generally translucent panel 80. The work space 120 and surface 60 may thus be illuminated without interference to the flow of air in and through the work station 10. The enclosure 74 is positioned outside of the air flow path (as indicated by the arrows and discussed in detail below) so as not to impede or interfere with air flow in and through the work station 10 (see, e.g., FIG. 2). A generally translucent panel 80 is provided in the enclosure 74 to facilitate illumination of the work surface 60.

A control panel 86 is mounted to one enclosure 74 and includes a controller 180 that monitors and controls the air flow in and through the work station 10, as discussed in more detail below.

Air flow in and through the work station 10 is provided by two blowers 34 (see, e.g., FIG. 3) mounted in the pressure cabinet 22, and which are controlled by the controller 180 (see, e.g., FIGS., 6A–6L), both of which are discussed in detail below. The blowers 34 include a motor 38 and impeller (not shown) and draw air into the pressure cabinet 22 through first and second air chamber 26, 28 so as to create a negative pressure in the work space 120. Air drawn in by the blowers 34 is directed to the top cabinet 16 through the air channels 15 defined in the supports 14. An air chamber 68 is defined within the top cabinet 16, and coupled to the air channels 15 to receive air from the blowers 34. The negative pressure created in the work space 120 causes air to be drawn from the air chamber 68 generally downward into the work space 120 and toward and through the apertures 62 defined through the surface 60. A more detailed discussion of air flow in and through the work station 10 will now be provided.

As shown in FIG. 3, pressure cabinet 22 provided within the base 12 is divided into first and second air chambers 26, 28, which respectively include first and second blowers 34. The air chambers 26, 28 and blowers 34 are substantially identical to each other. The following detailed discussion will thus be directed to one air chamber 26 and blower 34, it being understood that such discussion applies equally to the other air chamber 28 and blower 34. An air intake chamber 27 is defined below the surface 60 and defines a path via which air is drawn from the work space 120 into the pressure cabinet 22, and more specifically, into the air chamber 26. The air intake chamber 27 includes an air intake port 29 defined through a subfloor 31 that also defines a bottom of the air intake chamber 27. A prefilter 40 is provided at the air intake port 29 to substantially limit the amount of particulate matter that enters the air chamber 26. Access to the prefilters 40 for cleaning and replacement is via the panel 21. While it is preferred that no particulate matter enter the air chamber 26, it will be recognized by persons skilled in the art and from the disclosure provided herein that some particulate matter will pass through the prefilter 40. It will also be recognized that a certain amount of particulate matter flowing into and through the air chamber 26 is acceptable, and will likely be removed from the air flow in and through the work station 10 by a HEPA filter 50, discussed in more detail below.

With continued reference to FIG. 3, a pliable transition 33 couples the air intake port 29 to an air intake duct 35, which in turn is coupled to the blower 34. Air is thus drawn into the pressure cabinet 22 by the blower 34 from work space 120 through perforations 62, as indicated by arrow A, into first air chamber 26 and air intake chamber 27, through prefilter 40 and into air intake duct 35, as indicated by arrow B. Air is then directed by the blower from the air intake duct 35 into the air channel 15 and generally upward as indicated by arrow C. The air exits the air channel 15 and enters the air chamber 68, as indicated by arrow D, and is drawn through the HEPA filter 50 by the negative pressure created in the work space 120. A curtain of air is thus created between the top cabinet 16 and base 12 so that the environment provided in the work space 120 is controllable and substantially free from contamination from ambient air (i.e., outside of the air curtain). Although referred to in the singular, it will be obvious to persons skilled in the art and from the disclosure provided herein that both blowers 34 and both supports 14 (and air channels 15) facilitate air flow in and through the work station 10.

Some air may be exhausted from the work station 10 via an opening 93 in a top access panel 91 of the top cabinet 16, and through a HEPA filter 95 which prevent contamination of the ambient environment. A slideable door 97 provides user control over the amount of air being exhausted from the work station 10.

With continued reference to FIG. 3, the pressure cabinet 22 will now be discussed in further detail.

AC power for the work station 10 is provided via a power cord 82 mounted beneath the base 12, as depicted in FIG. 3. Power cord 82 thus provides AC power for the light source 71, blowers 34, controller 180, and in an automated embodiment, to crank assembly 64.

The work station 10 (i.e., the surface 60) may be selectively raised and lower to provide a comfortable height for a user. In the double-sided work station 10, and with reference to FIGS. 1–3, a lift mechanism 64 is provide in the base 12 and includes four hydraulic cylinders 66 are located at opposite corners of the base unit 12 and connect the base unit 12 to the wheel assembly 18. The lift mechanism 64 also includes a lift system drive motor (not shown), hydraulic pump 68, and a transformer 69 for the drive motor (see, e.g., FIG. 3). The base 12 (and surface 60) may be raised and lowered with respect to the wheel assembly 18 via the controller 180 and control panel 86 (see, e.g., FIG. 5). Alternatively, a manual lift mechanism 64 may be provided via which a user may manually raise and lower the base 12 using a crank and suitable lifting structure (e.g., gears, rods, etc.).

Figure 4:
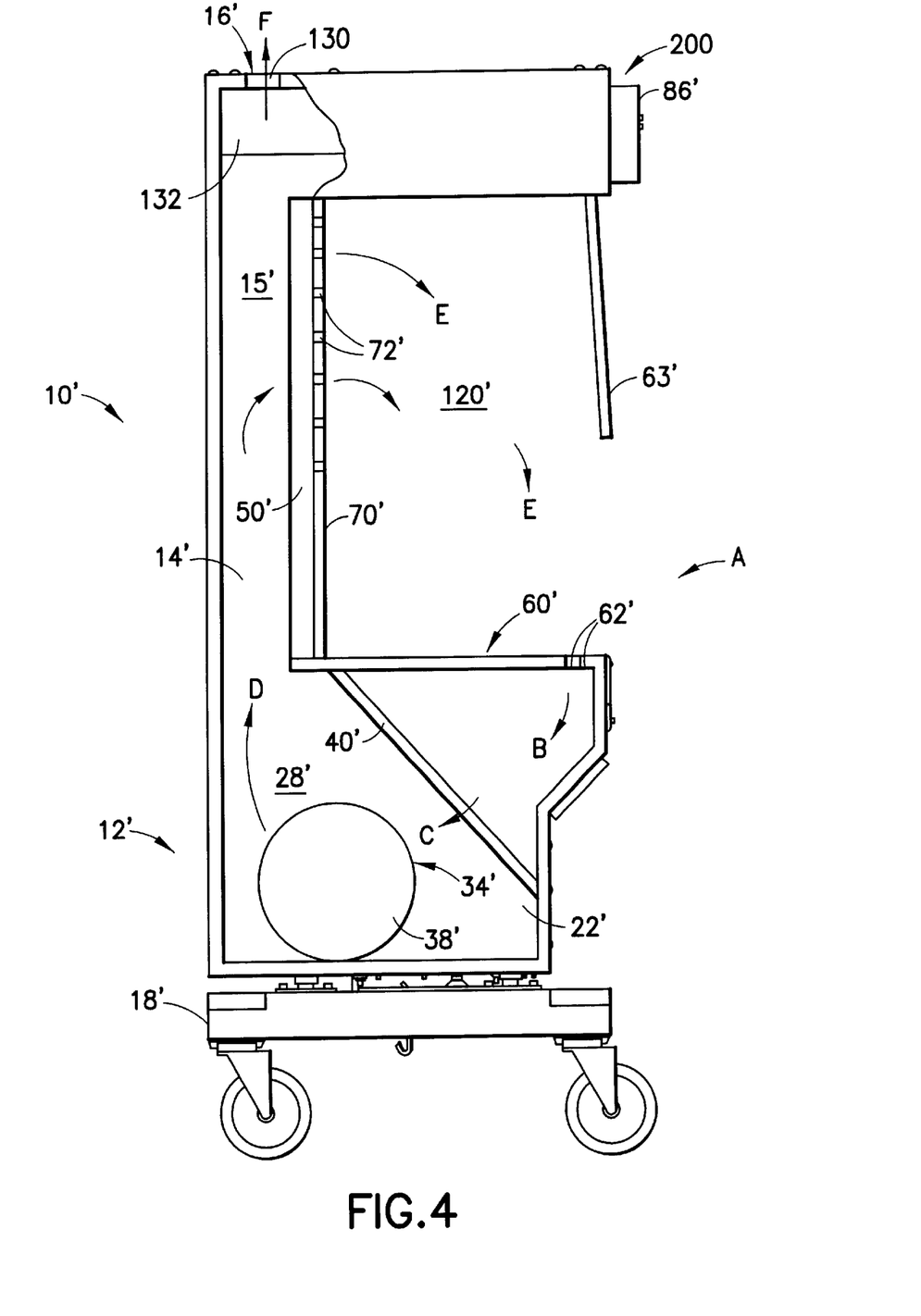
FIG. 4 is a partial cross-sectional side view of a single-sided work station constructed in accordance with another embodiment of the present invention.

Referring next to FIG. 4, a single-sided work station 10' constructed in accordance with another embodiment of the present invention is there depicted. The work station 10' includes a base 12' and a top cabinet 16' supported by a support 14' extending generally upward and out of the base 12' and through which an air channel 15' is defined. The base 12' includes a wheel assembly 18' that facilitates movement of the work station 10'. A top surface 60' is provided on the base 12' and includes a plurality of perforations 62' defined at least partially about the perimeter of the surface 60'.

A chamber 28' is defined in the base 12' within which is provided a blower 34' comprising a motor 38' including a fan (not shown). Preferably, the blower 34' comprises an electrical commutated motor (ECM) such as that manufactured by General Electric Company. Unlike a conventional induction motor, an ECM motor regulates itself (or is regulated by a controller 180 as described in detail below) by automatically changing torque and speed to maintain a programmed level of constant air flow over a wide range of external static pressures. The characteristics of the work station 10' (e.g., its air flow volume) are programmed into the controller 180 (i.e., the microprocessor U7). The characteristics of the motor 38' are also programmed into the controller 180. Those data are then utilized by the controller 180 to control the rotational speed of the motor 38' to maintain a desired air flow rate in and through the work station 10', even as filters (e.g., prefilter 40' and HEPA filter 50') begin to clog.

The blower 34', together with the controller 180 provide and control air flow in and through the work station 10', generally depicted by arrows A–F. Air is drawn into the chamber 28' by the blower 34' through the perforations 62' in the surface 60', as indicated by arrows A and B. The air is then drawn through a pre-filter 40' and directed into a support 14' and through air channel 15' generally upwards and away from the chamber 28', as indicated by arrow D. The blower 34' also creates a negative pressure in a work space 120' defined above the surface 60' so that air flowing through support 14' in the air channel 15' is drawn into the work space 120' through a plurality of perforations 72' provided in a generally vertically oriented back wall 70', as indicated by arrow E. Located adjacent the back wall 70', and between the support 14' and work space 120', is a HEPA filter 50' that removes particulate matter from the air flow prior to its entering into the work space 120'. A certain amount of air may be exhausted from the work station 10' via an opening 130 defined in the top cabinet 16'. A HEPA filter 132 is provided at the opening 130 to prevent contamination of the ambient environment.

A controller 180 is mounted in and to a panel 86' located external of the top cabinet 16'. The controller 180 is connected to the blower 34' and monitors and controls the operation of the motor 38' to ensure that a desired air flow is maintained in and through the work station 10'.

Figure 6A:
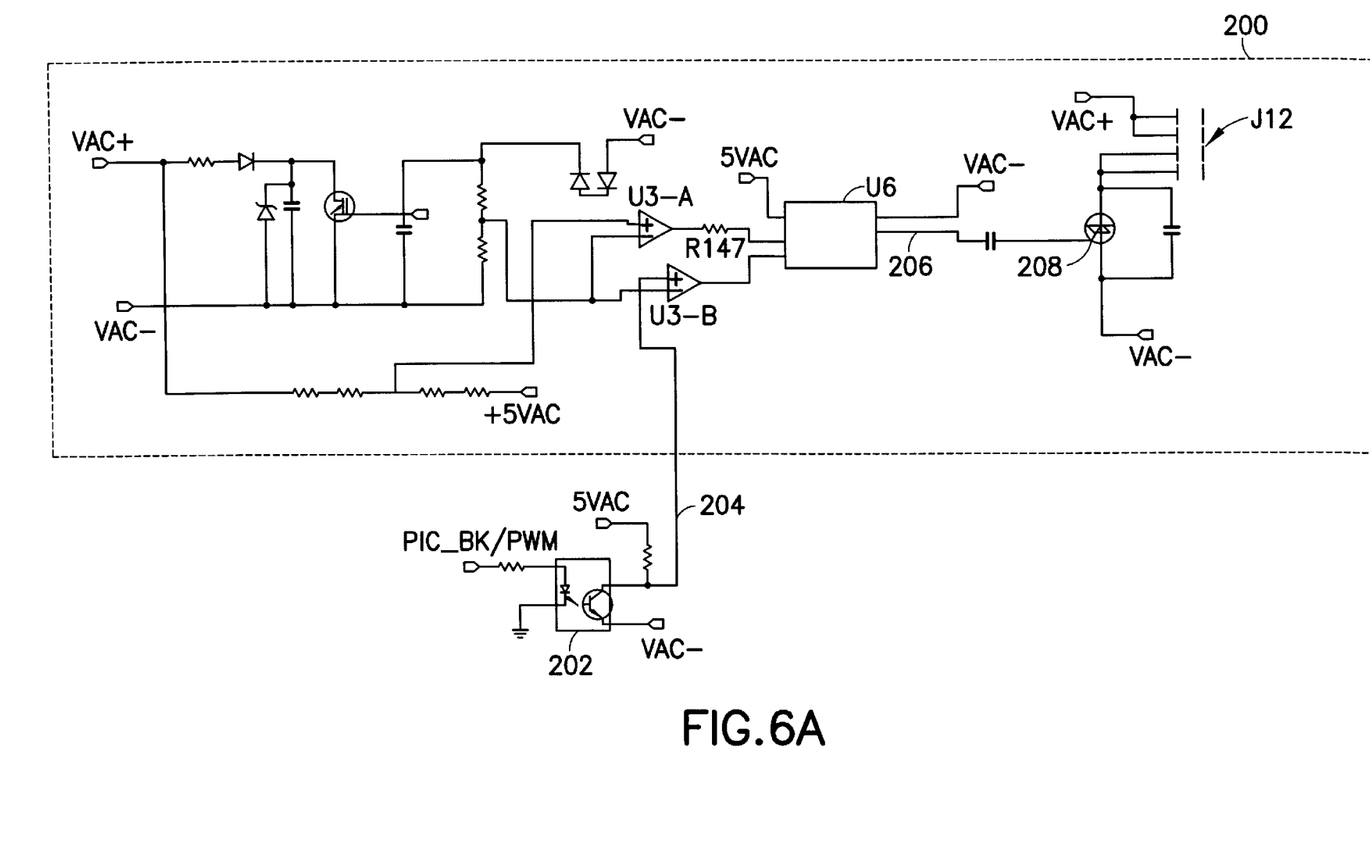
Figure 6B:
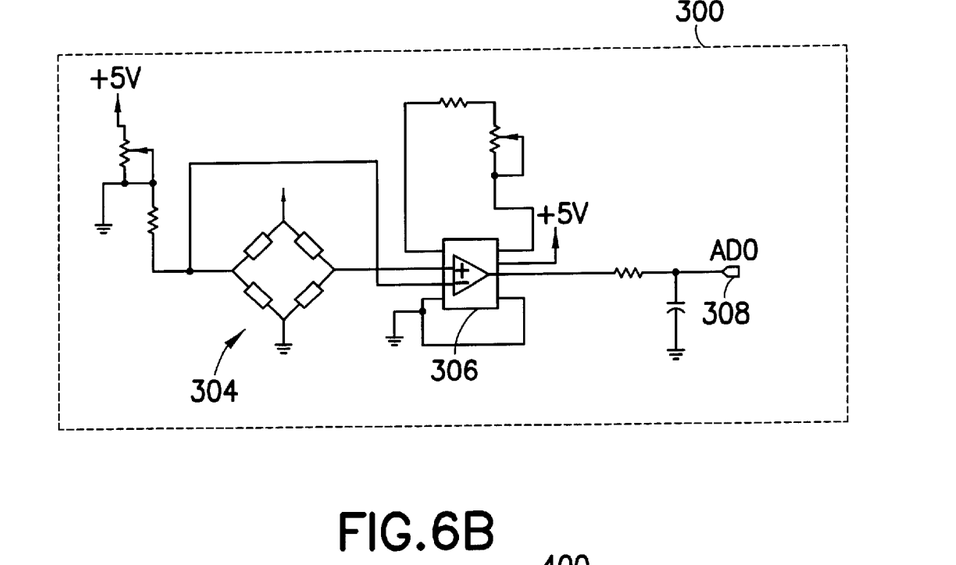
Figure 6C:
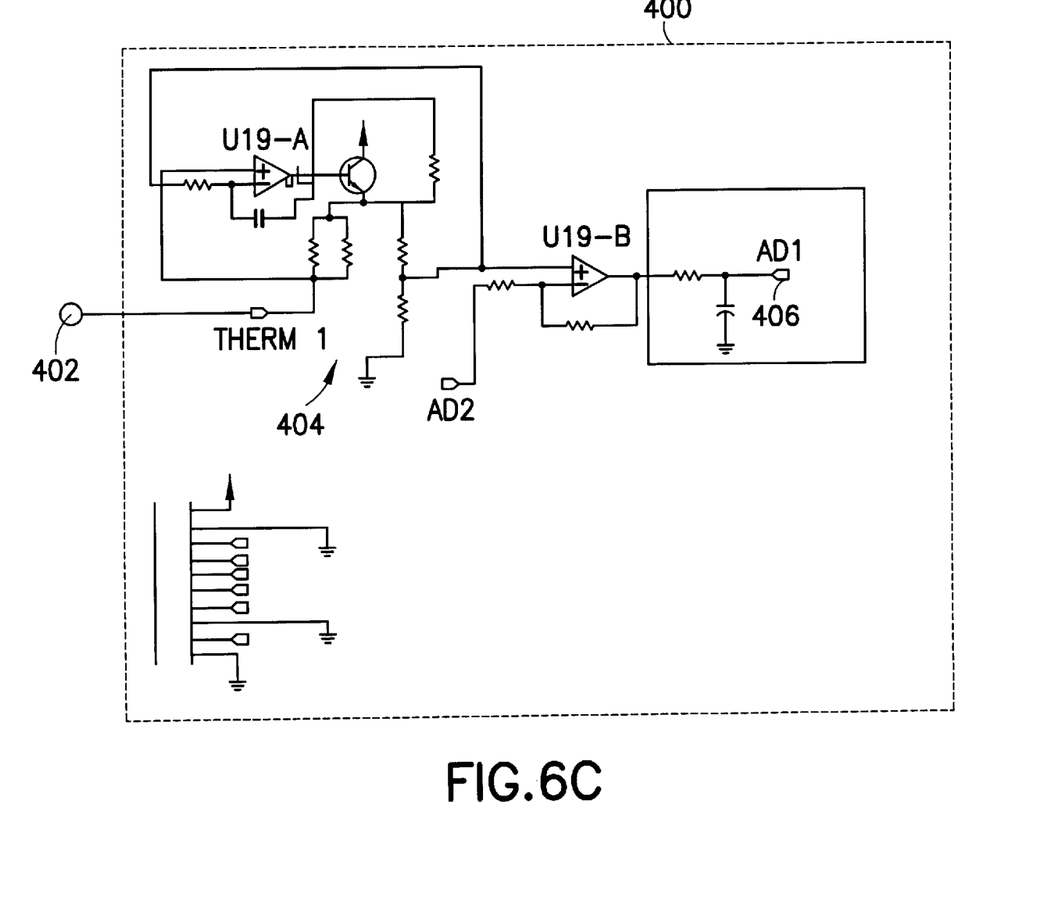

With reference next to FIGS. 6A–6L, the operation of the controller 180 for the double and single-sided work station embodiments will now be discussed in detail. Control of air flow in and through the double-sided work station 10 is generally achieved using a sensing device 402 (see, e.g., FIG. 6C), a microprocessor U7 (see, e.g., FIG. 6J), and a motor control circuit 600 (see, e.g., FIG. 6E). With reference first to FIG. 6C, an air flow sensor circuit 400 is connected to a negative temperature coefficient thermistor 402 located in the air chamber 68. Alternatively, a positive temperature coefficient thermistor may be used, as a routine matter of design choice. The air flow sensor circuit 400 is intended to keep thermistor 402 at a constant resistance value, and thus at a constant temperature. It does this in the following way: in a steady state condition, the wheatstone bridge circuit 404 is balanced. The rate of energy being delivered to the thermistor (electrically) 402 is exactly equal to the rate of energy being removed from the thermistor 402. This results in an increase in the thermistor's resistance, which in turn creates an imbalance in the wheatstone bridge circuit 404. The op-amp U19-A will rebalance the wheatstone bridge circuit 404 by increasing the voltage output by the op-amp U19-A and thus increasing the amount of electrical energy being delivered to the thermistor 402. The voltage output from the op-amp U19-A will increase until the wheatstone bridge circuit 404 is rebalanced. The voltage signal output from the op-amp U19-A is thus a measure of the velocity of airflow in and through the work station 10 and can be used to monitor and control that air flow. Location of the thermistor 402 is a matter of design choice, and should preferably be in a location with relatively little turbulence in the air flow stream. One such location may be at the output side of HEPA filter 50.

Figure 6D:
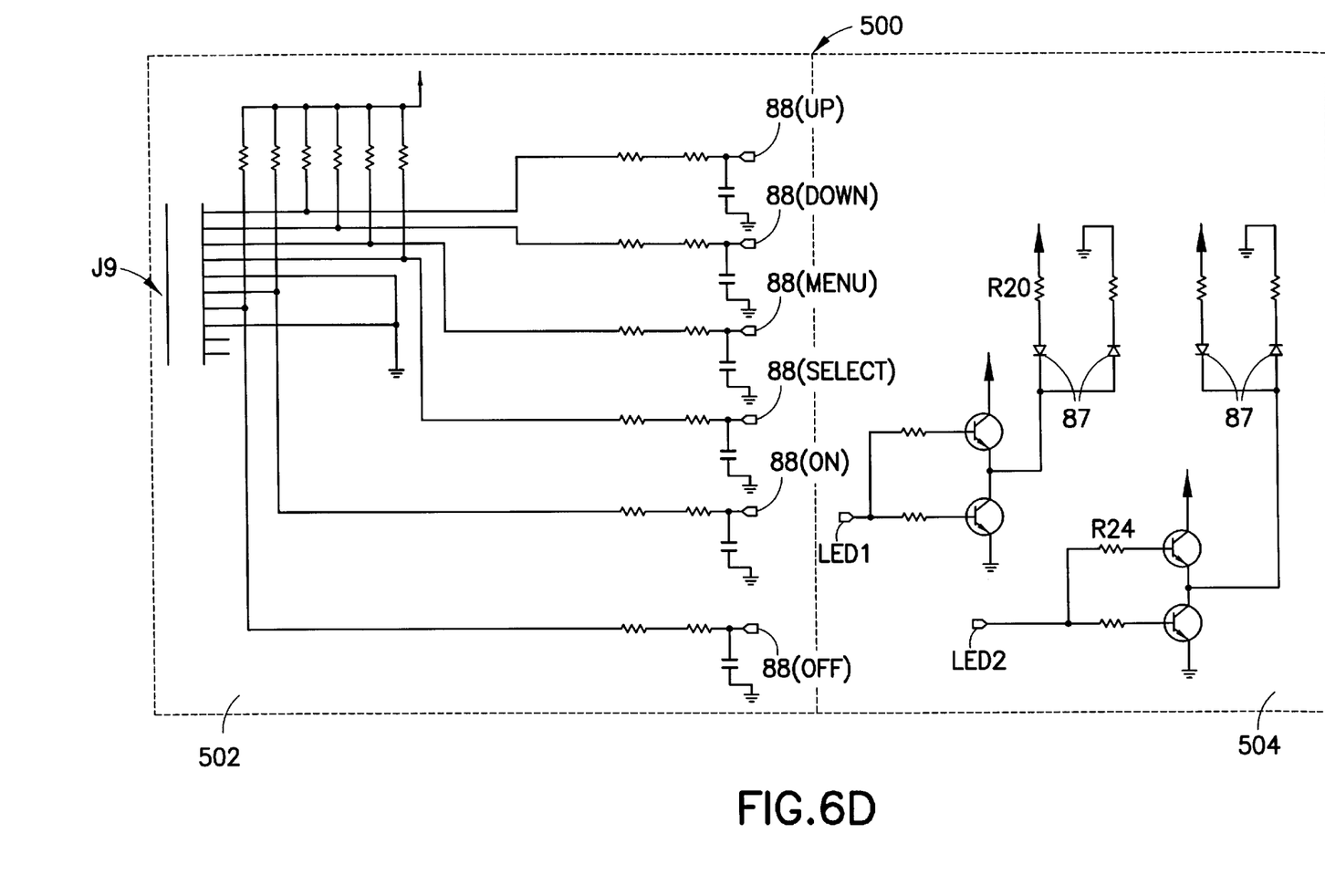
Figure 6E:
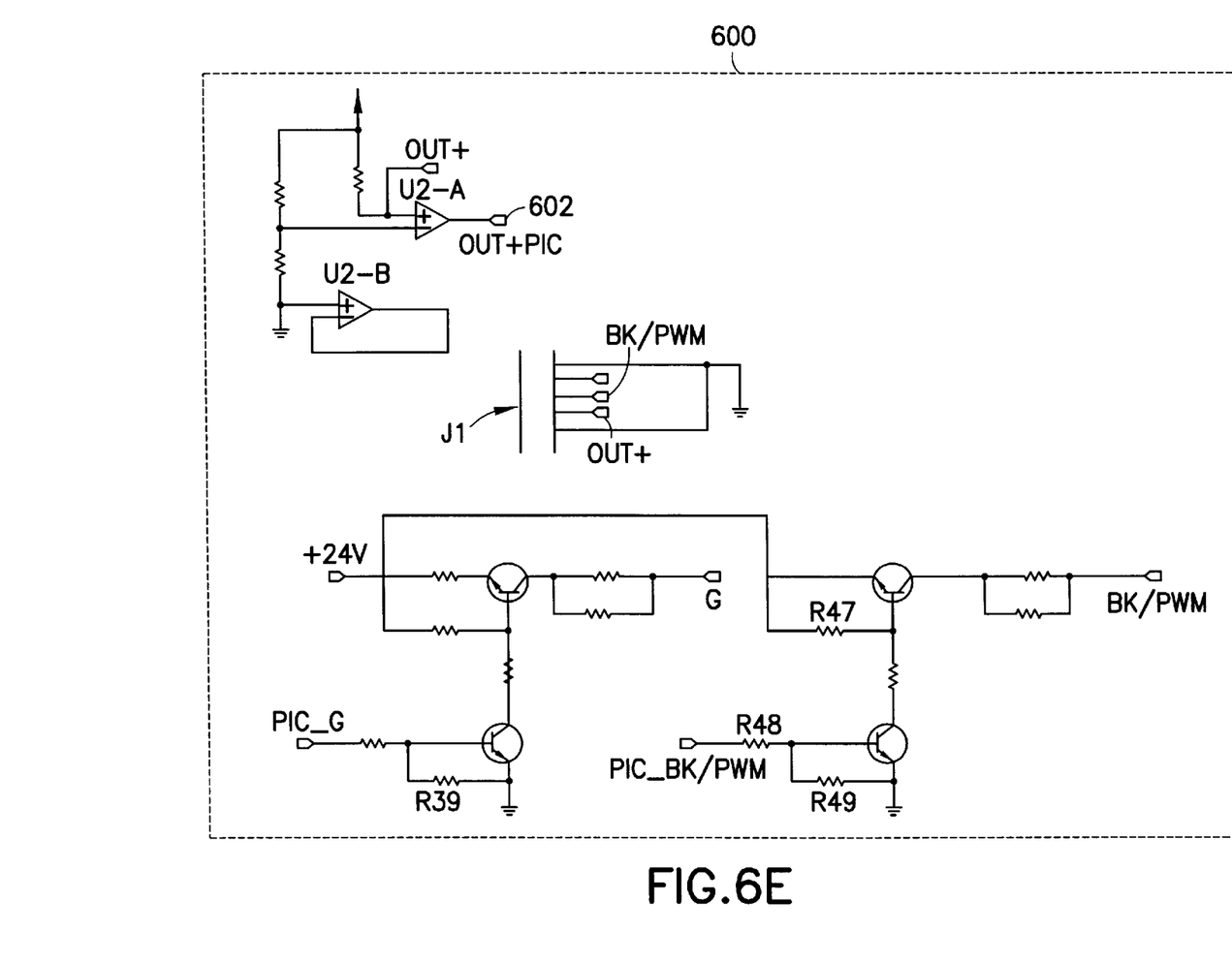
Figure 6F:
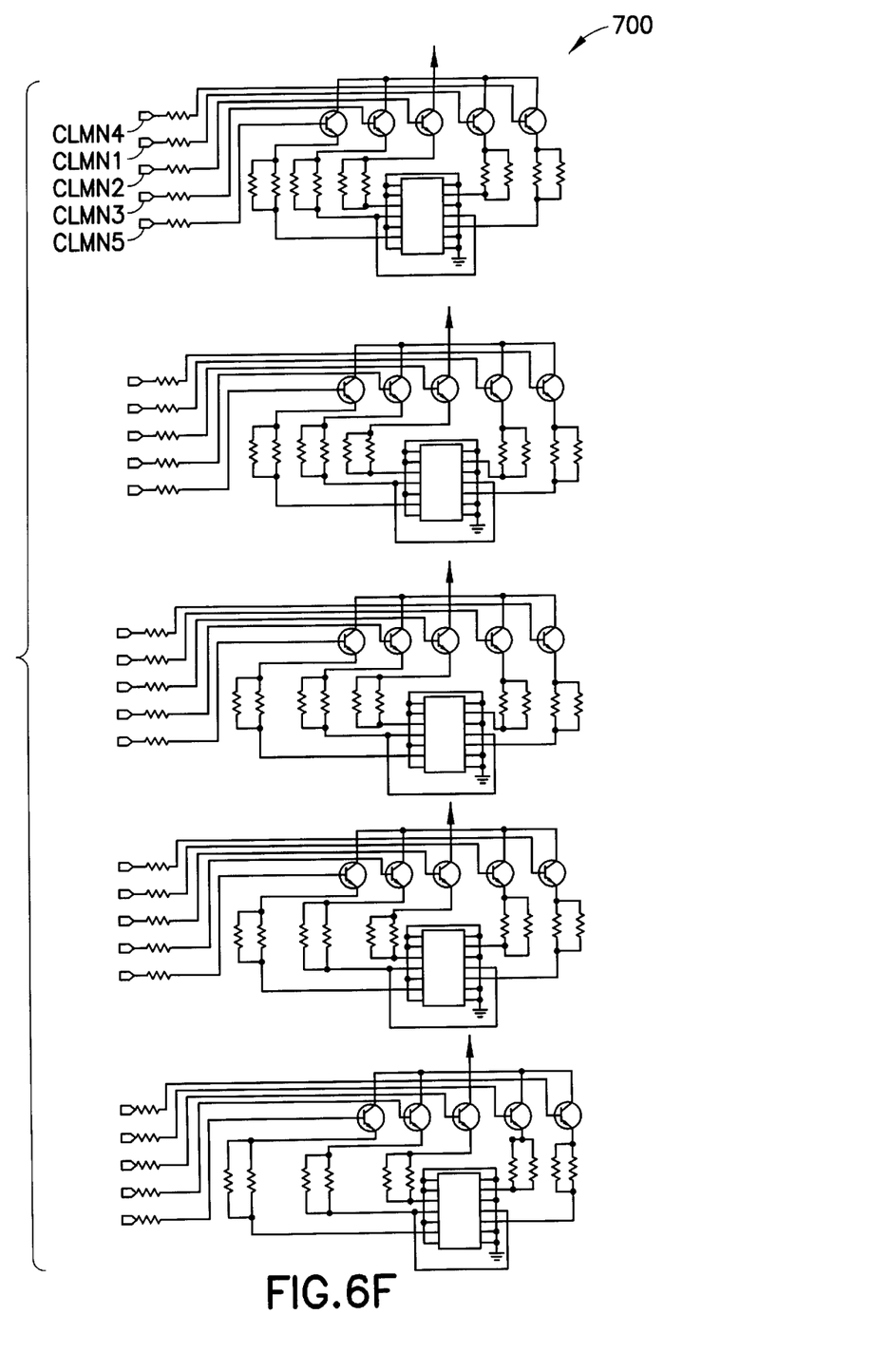
Figure 6G:
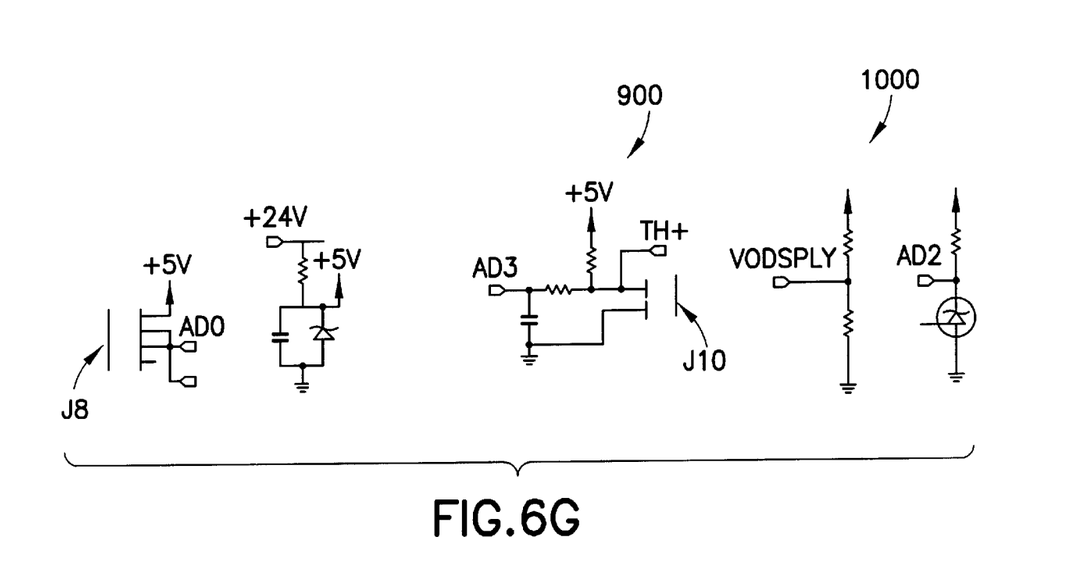
Figure 6H:
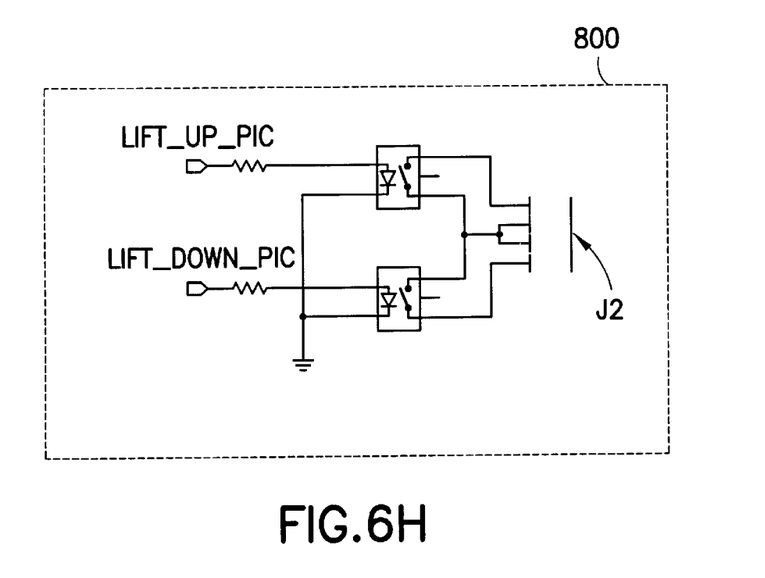
Figure 6J:
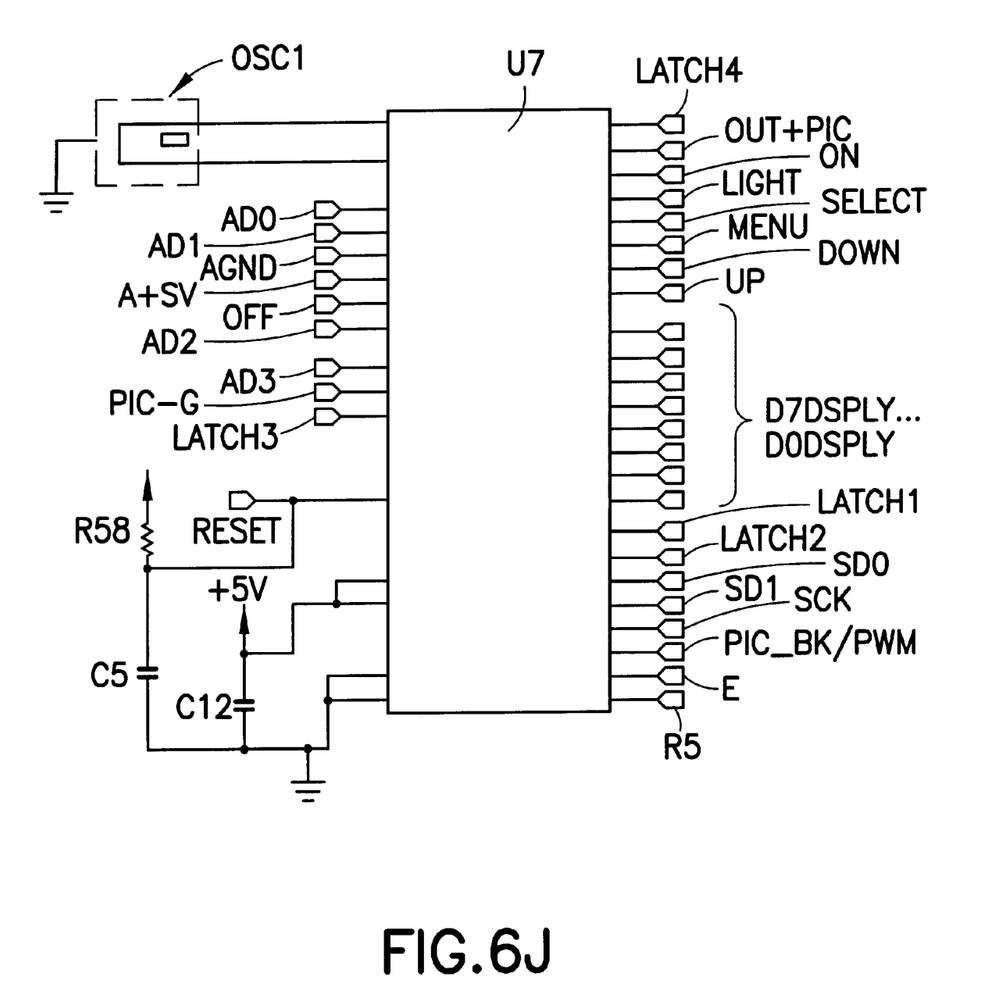

An output 406 (AD1) from the air flow sensor circuit 400 connects to microprocessor U7 at input AD1, depicted in FIG. 6J. The microprocessor U7 is an integrated analog-to-digital converter, includes digital input and output, and on-chip RAM and ROM. The microprocessor U7 may thus be suitably programmed to provide the desired monitoring and control functionality of the present invention, in ways generally known in the art and as described in detail herein. The microprocessor U7 receives a signal from the air flow sensor circuit 400 that indicates the air flow rate in and through the work station 10 (as a function of temperature, in this embodiment), and generates a pulse output signal on output PIC_BK/PWM to an opto-isolator 202 which isolates the microprocessor U7 from the AC voltage (VAC+, VAC−) provided as input to the motor control circuit 200, depicted in FIG. 6A. The opto-isolator 202 provides an output 204 to the motor control circuit 200 which is connected through op-amp U3-B to microcontroller U6. An output 206 from microcontroller U6 connects to a triac 208, which provides an output signal to connector J12, which provides a connection from the controller 180 to the blower 34. The output 206 from microcontroller U6 is derived from and based on the pulsed output from the microprocessor U7. Microcontroller U6 provides an output to adjust the phase angle (i.e., input voltage) of the blower 34 as a function of the pulsed output received from the microprocessor U7 and thus controls the air flow in and through the work station 10 based on a detected air flow rate derived from temperature.

In an alternative embodiment, air flow in and through the work station 10 may be monitored and controlled using a pressure circuit 300, as depicted in FIG. 6B. Air pressure in the work station 10 is detected using a pitot tube 302 (see, e.g., FIG. 2) as the sensing device that may extend substantially across the width of the work space 120. The pitot tube 302 is coupled to a wheatstone bridge circuit 304, the outputs of which are connected to a conditioning circuit 306 which converts detected pressure into an electrical signal, which is output on 308 (AD0) and connects to microprocessor input AD0. Control of the blower 34 is as described above.

For a single-sided work station 10', control of air flow in and through the work station 10' is generally achieved using the microprocessor U7 (see, e.g., FIG. 6J) and a motor control circuit 600 (see, e.g., FIG. 6E). Motor control circuit 600 provides an electrical commutated motor (ECM) interface to the motor 38' and maintains a rotational speed of the motor 38' to ensure a desired rate of air flow (e.g., cubic-feet-per-minute) in and through the work station 10'. The motor 38' provides an output signal OUT+ indicating its rotational speed. That signal is input to the control circuit 600 via input connector J1. From the control circuit 600, the motor rotational speed signal is connected to the microprocessor U7 via output 602 (OUT+PIC). The microprocessor U7 provides a pulsed output signal PIC_BK/PWM to the control circuit 600 based upon the rotational speed signal received from the control circuit 600. Output from the control circuit 600 to the motor 38' is via connector J1 as signal BK/PWM. Control of the rotational speed of the motor 38' and thus the rate of air flow in and through the work station 10' is thus provided by the controller 180 of the present invention.

In operation, as the rotational speed of the motor 38' decreases, which may occur as the air flow path becomes impeded (such as when a filter begins to clog), the microprocessor U7 can detect that change in rotational speed and adjust (i.e., increase) the rotational speed of the motor 38' by outputting an appropriate signal. Similarly, if an increase in rotational speed is detected, the microprocessor U7 may decrease the rotational speed of the motor 38'. The controller 180 of the present invention thus provides the ability to maintain a desired and substantially constant rate of air flow in and through the work station 10', based, at least in part, on the rotational speed of the motor 38'.

For the single-sided work station 10' embodiment, the microprocessor U7 is preferably programmed with data relating to the air flow volume within the work station 10'. The microprocessor U7 is also preferably programmed with performance curve data for the motor 38' (e.g., rotational speed (RPM) versus normalized motor torque).

Figure 5:
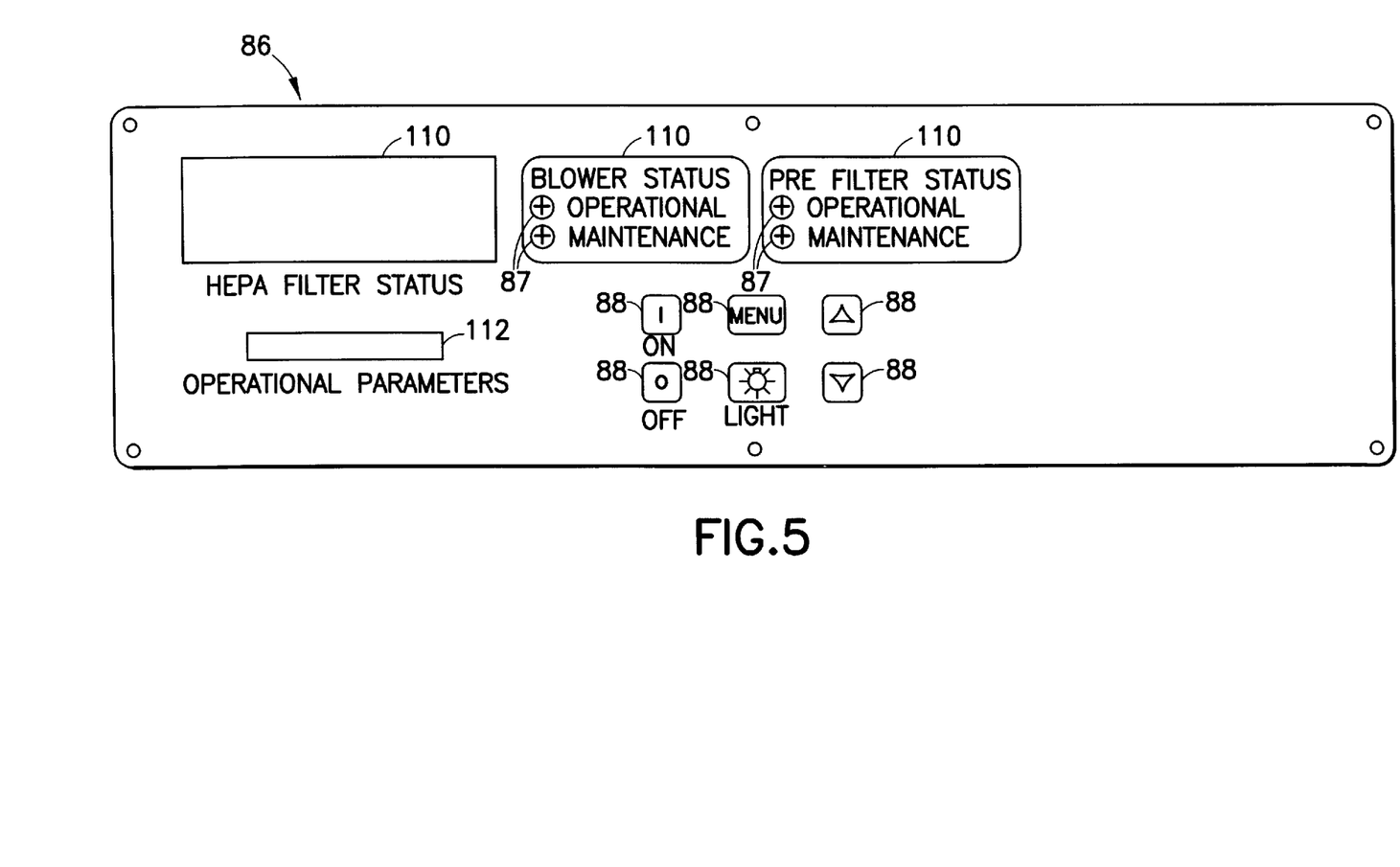
FIG. 5 is an exemplary panel for a controller of the present invention.

The controller 180 of the present invention also provides for various user input and system status and control display functionality, which will now be discussed in detail and with continued reference to FIGS. 6A–6L and additional reference to FIG. 5. Referring first to FIG. 6D, an interface circuit 500 includes a keyboard circuit 502 and a LED circuit 504. The keyboard circuit 502 provides a plurality of user accessible buttons 88 on the control panel 86 via which a user may, by way of non-limiting example, turn the controller 180 (and the work station) on and off, access a menu providing a plurality of user-selectable options, scroll up or down through the menu, select a menu option, and turn a light on and off. A connector J9 connects the keyboard circuit 502 to the microprocessor U7, which detects a user selection (i.e., depression of a button 88), interprets that selection, and responds accordingly (e.g., by causing the light to turn on or off).

A LED circuit 504 provides a plurality of LEDs 87 on the control panel 86 which provide a visual indication of, by way of non-limiting example, blower status and prefilter status.

The controller 180 may also provide and control a plurality of displays including a dot matrix display 110 and a liquid crystal display 112, which may provide a visual indication to a user of, for example, HEPA filter status and other operational parameters (e.g., CFM). Control of the dot matrix display is provided the display circuits 700 and 710, respectively depicted in FIGS. 6F and 6I. Display circuit 710 is connected to microprocessor U7 via lines D0DSPLY . . . D7DSPLY, and is connected to display circuit 700 via lines CLMN1 . . . CLMN24. The dot matrix display 110 may be configured to display a status of the HEPA filter 50 as a graduated scale. The microprocessor U7 may thus control the display 110 and provide to the user, via the display 110, a plurality of information relating to the configuration and operation of the work station.

Figures 6K, 6L:
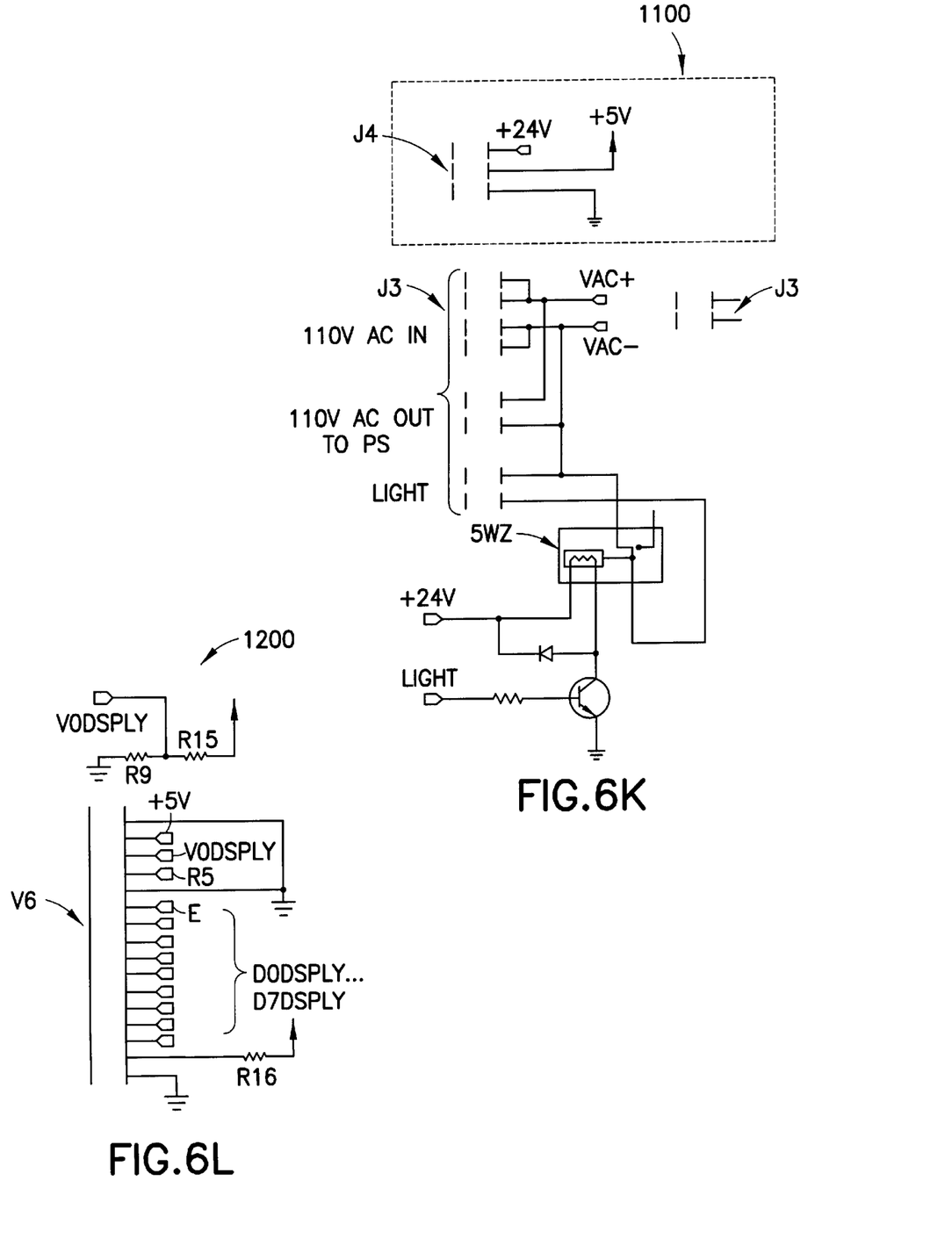

Control of the liquid crystal display 112 is provided by display circuit 1200, depicted in FIG. 6L, and which is connected to microprocessor U7 via lines D0DSPLY . . . D7DSPLY.

Monitor of the temperature within the single-sided work station 10' may also be provided by the controller 180. Referring next to FIG. 6G, a temperature detection circuit 900 receives input via TH+ from a thermistor (not shown) mounted in the work station 10' at a desirable location such as, for example, near the work space 120. The temperature circuit 900 is connected to the microprocessor U7 via line AD3. Temperature data may thus be received by the microprocessor U7 and displayed to a user via the liquid crystal display 112, for example.

It may also be desirable to provide back-lighting for the display 112, which can be provided by lighting circuit 1000, also depicted in FIG. 6G and provided as part of the controller 180.

As discussed in more detail herein, the work station 10, 10' may be raised and lowered to provide a convenient working height using a height control assembly 64. Control of that assembly 64 is provided by the controller 180, and specifically by the lift interface circuit 800 depicted in FIG. 6H. Connector J2 provides an interface between the controller 180 and the height control assembly 64.

AC and DC power input to the controller 180 is via power input circuit 1100 depicted in FIG. 6K. An AC input signal (e.g., 110/220 VAC) is connected to the controller 180 via part of connector J3. That AC input signal is connected to the light source 71 via suitable switching and isolating circuitry (e.g., SW2 of FIG. 6K), and connected via part of connector J3 to a commercial power supply that accepts an AC input and provides dual-output DC, preferably 24 and 5 VDC. The dual-output DC is connected to the controller 180 via connector J4 to provide DC power to the controller 180.

In operation, a technician may place an animal cage on the surface 60. The technician is now isolated from the cage by the air curtain. Additionally, the cage is now isolated from the ambient environment outside of the work station and outside of the rack by the air curtain. In a double-sided work station 10, two technicians can simultaneously work in the work space 120 without fear of contamination between their respective cages.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A work station comprising:
   a base;
   a top cabinet;
   a support extending from said base and supporting said top cabinet, an air flow channel through which air may flow being defined through said support and partially through said base and said top cabinet;
   a work surface disposed on and forming a top to said base and having perforations along at least a portion thereof;
   a pressure inducing assembly located in said base for causing air to move through said air flow channel; and
   a controller for detecting an air flow parameter in said work station and connected to said pressure inducing assembly for automatically controlling said pressure inducing assembly based on said detected air flow parameter, said controller comprising:
     an air flow detector located in said air flow channel;
     a microprocessor connected to said air flow detector for receiving a signal therefrom and for converting said received signal to a digital pulse signal; and
   a motor control circuit connected to said microprocessor for receiving said digital pulse signal therefrom, said motor control circuit being connected to said pressure inducing assembly for providing a signal thereto to control the movement of air through said air flow channel.

2. The work station of claim 1, wherein said support comprises first and second supports located on first opposite sides of said work station and wherein said work surface is accessible from opposite sides of said work station different than said first opposite sides of said work station.

3. The work station of claim 2, wherein said pressure inducing assembly comprises:
   a first air chamber defined in said base and having a first blower having an first impeller and a first motor; and
   a second air chamber defined in said base and having a second blower having a second impeller and a second motor.

4. The work station of claim 3, wherein said air flow detector comprises an air flow sensor circuit including a thermistor located in said air flow channel for detecting a temperature therein, and wherein said motor control circuit is connected to said first and second motor for providing a signal thereto to control a rotational speed thereof.

5. The work station of claim 3, wherein said air flow detector comprises a pressure circuit including a pitot tube located in said air flow channel for detecting a pressure therein, and wherein said motor control circuit being connected to said first and second motor for providing a signal thereto to control a rotational speed thereof.

6. The work station of claim 1, wherein said support comprises a support located at a rear of said work station and wherein said work surface is accessible from a front of said work station.

7. The work station of claim 6, wherein said pressure inducing assembly comprises an air chamber defined in said base and having a blower having a fan and an ECM motor.

8. The work station of claim 7, wherein said controller comprises:
   said motor control circuit connected to said motor for receiving a signal therefrom indicating a rotational speed thereof, said motor control circuit being connected to said microprocessor for providing a signal thereto indicating the rotational speed of said motor, said microprocessor providing a signal to said motor control circuit in response to said signal received from said motor control circuit, said motor control circuit being connected to said motor for providing a signal thereto to control a rotational speed thereof based upon said signal received by said motor control circuit from said motor.

9. The work station of claim 1, wherein said perforations are formed about the periphery of said work surface.

10. The work station of claim 1, further comprising a HEPA filter disposed in said air flow channel.

11. The work station of claim 1, further comprising a HEPA filter disposed in said top cabinet.

12. The work station of claim 6, further comprising a HEPA filter disposed in said support.

* * * * *